May 19, 1931.  E. W. VON WALDENBURG-STRAUS-SCHARINA  1,806,513
FILTER FOR SEPARATING DUST FROM AIR OR GAS
Filed July 22, 1930   2 Sheets-Sheet 2

Inventor
E. W. von Waldenburg Straus-Scharina, by *F. W. Dahn,*
Attorney.

Patented May 19, 1931

1,806,513

UNITED STATES PATENT OFFICE

EDUARD WILHELM VON WALDENBURG STRAUS-SCHARINA, OF LUBECK, GERMANY

FILTER FOR SEPARATING DUST FROM AIR OR GAS

Application filed July 22, 1930, Serial No. 469,801, and in Germany May 28, 1929.

My invention relates to improvements in filters for separating dust from air or gas, and more particularly in filters of the type comprising a plurality of tubular filtering elements. The object of the improvements is to provide a filter of this class which has a high efficiency, and with this object in view my invention consists in providing means for removing the dust deposited on the filtering members during the filtering operation. In the preferred form the said means consist of mechanism operative during the filtering operation for shaking the filtering members by imparting thereto, in rapid succession, blows acting longitudinally of the filtering members. I have discovered that thereby the deposition of dust on the filtering cloth and the obstruction of the pores thereof are prevented.

In the preferred construction the tubular filtering members are elastically supported, so that the vibration of the filtering members continues between the successive blows imparted thereto.

Figure 1:
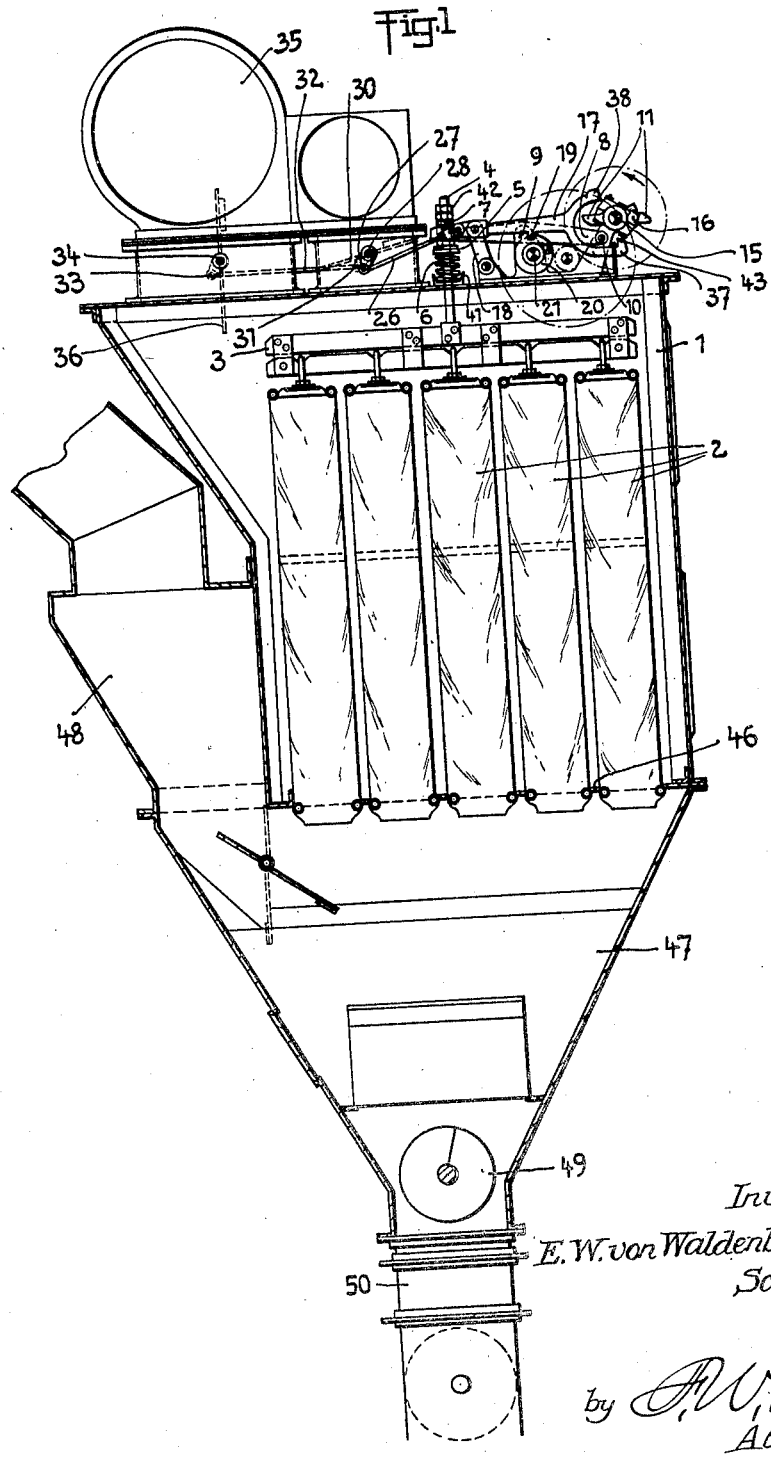
Figure 2:
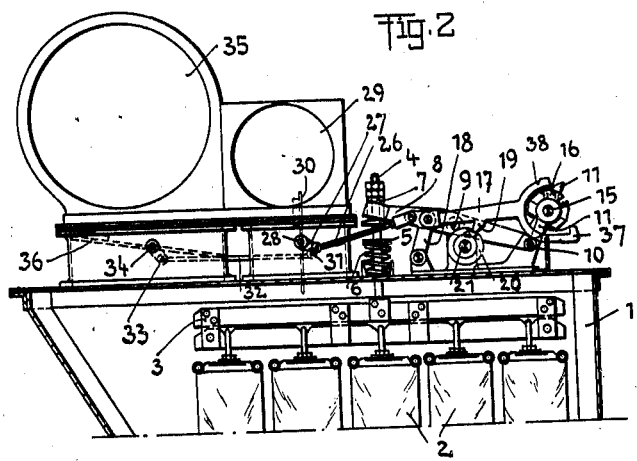
Figure 3:
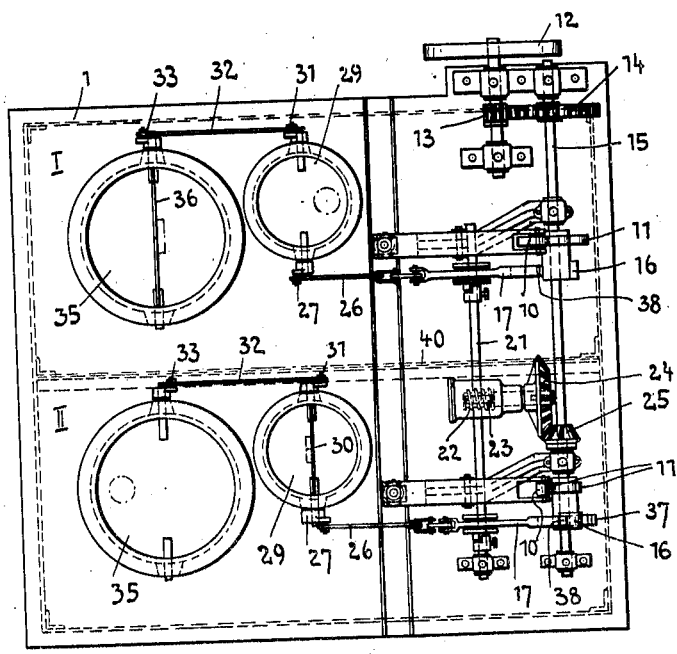

In order that the invention be more clearly understood an example embodying the same has been shown in the accompanying drawings, in which the same letters of reference have been used in all the views to indicate corresponding parts. In said drawings, Fig. 1 is a sectional elevation showing the filtering apparatus, Fig. 2 is a similar sectional elevation showing the top part of the apparatus with the operating devices in different positions, and Fig. 3 is a top plan view of Fig. 1.

In the example shown in the drawings the filtering apparatus comprises a receptacle 1 divided by a partition 40 into chambers I and II each containing a large number of tubular filtering members 2. At their bottom ends the filtering members 2 are passed through a horizontal partition 46, and they open into a chamber 47 common to all the chambers I and II and communicating with an intake passage 48 for supplying the air to be filtered. At the bottom of the chamber 47 a screw conveyor 49 is provided by means of which the dust separated from the air is conveyed to a delivery pipe 50 for being re-moved from the apparatus. The construction of the filtering apparatus is known in the art and I deem it not necessary to describe the same more in detail.

As shown the said filtering members are suspended from frames 3 each carried by a rod 4 passed upwardly therefrom through the top wall of the receptacle 1. The said rod 4 is provided with a collar 5 by means of which it is supported on a coiled spring 6 bearing on a channel iron 41 secured to the top of the receptacle 1. Above the collar 5 a sleeve 7 is slidable on the rod 4, which is held in position by means of nuts 42 screwing on the rod. The said sleeve is engaged by the bifurcated end of a lever 8 rockingly supported on a bracket 9 mounted on the top of the receptacle 1, and the opposite end of the said lever carries a rotary roller 10. The said roller is in position for being acted upon by a rotary member 11 secured to a shaft 15 and comprising two arms adapted to impart blows to the roller 10. The shaft 15 is adapted to be rotated from a pulley 12 through the intermediary of gear wheels 13 and 14. The member 11 is connected with a cam 16 cooperating with the bifurcated end of a controlling lever 17 rockingly supported on the receptacle 1 through the intermediary of a link 18 and formed with a lug 19 in sliding engagement with a cam 20 secured to a shaft 21, the said shaft being adapted to be rotated from the shaft 15 through the intermediary of a bevel gearing 25, 24 and a worm gearing 22, 23. The link 18 is connected by a link 26 with a crank arm 27 secured to a shaft 28 carrying a gate 30 adapted to open and close a passage 29 connected with the receptacle 1 for suppling fresh air thereto for cleaning the filtering members. To the shaft 28 a second crank arm 31 is secured which is connected by a link 32 with a crank arm 33 secured to a shaft 34 carrying a gate 36 adapted to open and close a passage 35 connected with the receptacle 1 for drawing the filtered air therefrom.

In the operation of the apparatus the shaft 15 is rotated in anti-clockwise direction from the pulley 12. Thereby the arms of member 11 mounted on the said shaft successively engage the roller 10 thus rocking the lever 8 about its fulcrum provided by the bracket 9. Thus the rod 4 and the filtering members 2 are thrown upwardly and into the position shown in Fig. 2, and whenever an arm of member 11 releases the roller 10 the filtering members and the lever 8 drop by gravity into the position shown in Fig. 1, the impact of the said filtering members being taken up by the spring 6. Thus the spring is compressed, and it throws the frame 3 upwardly again thus continuously vibrating the filtering members. By reason of the rapid rotation of the member 11 the said operation is repeated in rapid succession, so that the filtering members are continuously vibrated.

Simultaneously the rotary shaft 21 is slowly rotated from the shaft 15, and after a certain time the cam 20 engages the lug 19 thus lifting the controlling lever 17 which therefore is brought with a nose 43 carried by the arm 37 into the path of the rotary cam 16. Thereby the lever 17 is shifted to the right and into the position shown in Fig. 2, so that the gate 30 of the passage 29 is opened and the gate 36 of the passage 35 is closed. Thus the filtering operation is interrupted, and a supply of fresh air is blown into the receptacle 1 through the passage 29, which fresh air flows through the filtering members in a direction for removing the dust separated therefrom, the vibrating of the filtering members being continued during the cleaning operation. In the meantime the suction passage 35 through which the filtered air is withdrawn from the receptacle 1 is closed by the gate 36. After a certain period of time, and after cleaning of the filtering members has been finished, the cam 16 engages the upper arm 38 of the lever 17 and returns the lever 17 into the position shown in Fig. 1. Thereby the passage 29 is closed, and the passage 35 is opened, so that filtering is continued while the filtering members are further vibrated.

I claim:

1. A filtering apparatus for air or the like comprising a chamber having an inlet for supplying dust-laden air, filtering members in the chamber, an outlet passage, an inlet passage for cleansing air, valves for said passages, automatic means for actuating said valves to open either passage and simultaneously to close the other approximately at the same time, and automatic means independent of the valve-actuating means for vibrating the filter members continually while the apparatus is in operation.

2. A filtering apparatus, comprising a receptacle having a passage for supplying dust-laden air, a passage for drawing filtered air from said receptacle and a passage for supplying cleaning air to said receptacle, valves controlling said passages, filtering members within said receptacle, mechanism for vibrating said filtering members to shake off accumulated dust, and means for opening and closing said valves, said vibrating mechanism being constructed to be operative while said valve of the passage for drawing air from said receptacle is in open position.

3. A filtering apparatus, comprising a receptacle having a passage for supplying air to be filtered, a passage for removing filtered air from said receptacle, and a passage for supplying fresh cleaning air to said receptacle, valves controlling said passages, a filtering member within said receptacle, vibrating mechanism for said filtering member, and mechanism for intermittently opening and closing said valves, said mechanism for opening and closing said valves and said vibrating means being timed so that the vibrating means is operative while the valve controlling the passage for withdrawing the filtered air is in open position.

In testimony whereof I affix my signature.

EDUARD WILHELM von
  WALDENBURG STRAUS-SCHARINA.